INVENTOR
PHILIP S. WESSELS
BY
*Bernard J. Brown*
ATTORNEY

Jan. 2, 1973 P. S. WESSELS 3,708,401
ACOUSTICAL DISTILLATION APPARATUS
Filed Oct. 13, 1969 4 Sheets-Sheet 2

INVENTOR
PHILIP S. WESSELS
BY
*Bernard J. Brown*
ATTORNEY

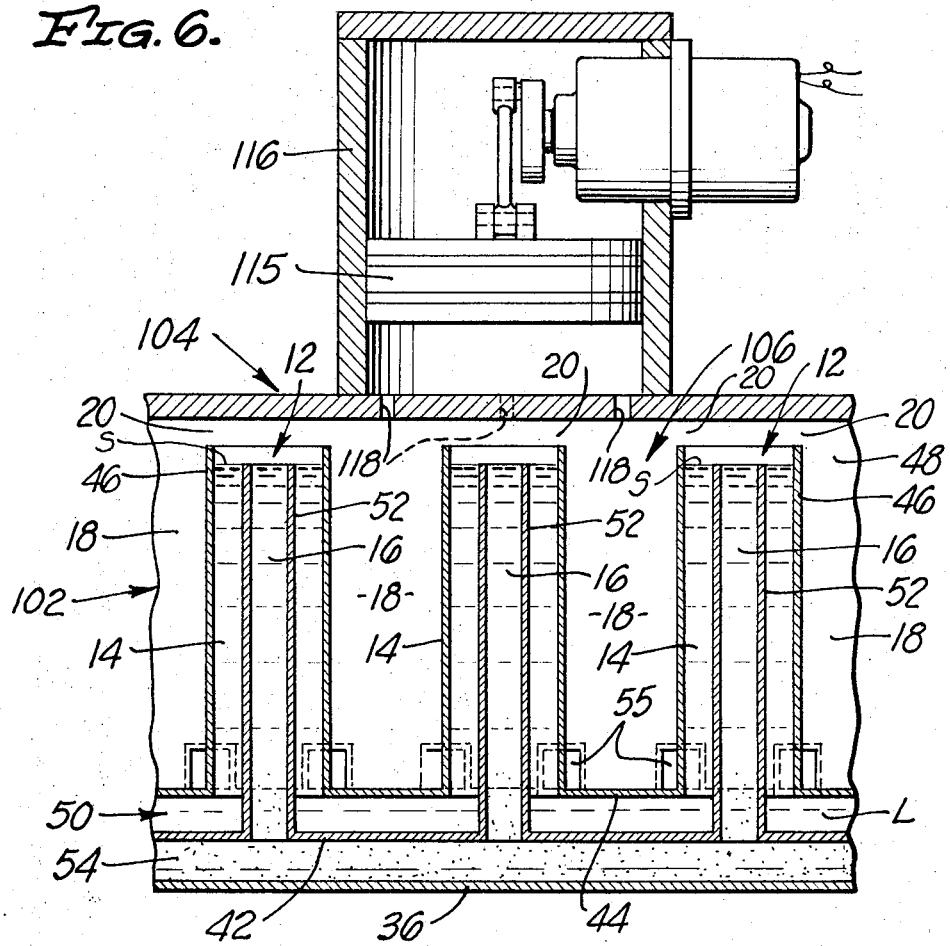

3,708,401
ACOUSTICAL DISTILLATION APPARATUS
Philip S. Wessels, Diamond Bar, Calif., assignor of a fractional part interest to Boniard I. Brown, West Covina, Calif.
Continuation-in-part of application Ser. No. 578,785, Sept. 12, 1966. This application Oct. 13, 1969, Ser. No. 865,561
Int. Cl. B01d *3/02*
U.S. Cl. 202—173                          7 Claims

ABSTRACT OF THE DISCLOSURE

An acoustic distillation method and apparatus are provided wherein the free surface of the liquid to be distilled is subjected to cyclic pressure fluctuations occurring at an acoustic frequency to cause the pressure at the liquid surface to proceed through alternate rarefaction and compression modes. During the rarefaction modes, the vapor pressure at the free surface of the liquid is lowered to induce vaporization of liquid from the surface and conversion of liquid enthalpy into kinetic energy of the liquid vapor. The vapor is super heated during the compression modes and is thereafter passed in heat transfer relation to the incoming liquid to preheat the latter. In one disclosed embodiment, the acoustic pressure fluctuations are produced by a mechanically powered oscillating diaphragm. In a second disclosed embodiment, the acoustic pressure fluctuations are produced by an acoustical vapor engine.

---

This application is a continuation-in-part of application Ser. No. 578,785, filed Sept. 12, 1966, now abandoned entitled "Acoustical Distillation."

This invention relates generally to the liquid distillation art; more particularly, the present invention relates to a novel acoustic distillation method and apparatus.

BACKGROUND OF THE INVENTION

Field of the invention

As will appear from the ensuing description, the acoustic distillation method and apparatus of the invention may be employed to distill various liquids and to obtain various products or distillates. A particularly useful application of the invention, however, involves the conversion of sea water to fresh water.

Prior art

Generally speaking, most if not all commercial distillation methods involve the application of heat, from an external heat source, to the liquid to be distilled for the purpose of boiling off a desired fraction of the liquid and subsequent condensation of the evolved vapor to a liquid condensate or distillate. These existing distillation methods, however, are subject to certain deficiencies which this invention seeks to overcome. One of the more serious deficiencies of the existing distillation methods, for example, resides in the relatively low efficiency of these methods. Such low efficiency is due, in large part, to the relatively high temperatures of the exitng distilled product and brine and to the heat loss from the distillation apparatus to its environment. Another outstanding deficiency of the existing distillation methods resides in the relatively high construction cost, high operating cost, complexity, and large size of the distillation apparatus required to practice the existing methods. These latter undesirable factors result, in part, from the high pressures involved in the existing distillation methods which create the necessity of pressure vessel construction for containment of the high pressures.

The above-noted deficiencies of the existing distillation methods and apparatus are particularly serious in the conversion of sea water to fresh water and have precluded large scale commercial distillation of sea water, until the relatively recent development of nuclear sea water conversion systems. However, even such nuclear desalting systems are quite complex, costly, and present a potential safety hazard which precludes their installation in many locations, notably heavily populated areas which, ironically, generally abut the large bodies of readily available sea water. Also, of course, the operation of any nuclear facility creates the problem of nuclear waste disposal which is difficult and costly.

SUMMARY OF THE INVENTION

The acoustic distillation method and apparatus of this invention avoids the above noted and other deficiencies of the existing distillation techniques. Briefly, the present distillation method involves transporting a liquid to be distilled through a closed distillation cell in such manner that the liquid enters the cell along an inflow path and the liquid has a free surface exposed to the interior space of the cell above the free surface, whereby evaporation of the liquid occurs from the free surface into the cell space; generating cyclic pressure waves or fluctuations at an acoustic frequency within the cell space above the free-surface to cause the pressure in this space to proceed through alternate rarefaction and compression half cycles or modes in such a way as to periodically lower the vapor pressure at the free liquid surface, thereby to induce additional vaporization of liquid from the free surface and conversion of liquid enthalpy into kinetic energy of the vapor within the cell space, during the rarefaction modes of the fluctuating cell pressure, and to periodically super heat the vapor remote from the free liquid surface during the compression modes of the fluctuating cell pressure; and directing vapor from the cell space along a condensation flow path disposed in heat transfer relation to the liquid inflow path in such manner as to establish a condition of thermodynamic equilibrium wherein the super heated vapor emerging from the cell spaces along the condensation flow path is progressively cooled and condensed by heat transfer to the liquid entering the cell along the liquid inflow path, the entering liquid is continuously heated by such heat transfer to a saturation temperature which creates within the cell space at the free liquid surface a saturation pressure exceeding the vapor pressure of the relatively cool condensate adjacent the down stream end of the condensate flow path, whereby a vapor pressure differential exists along the latter flow path, and this pressure differential and the kinetic energy of the vapor within the cell space coact to induce flow vapor from the space along the condensation flow path. The vapor pressure differential existing along the condensation flow path, and the kinetic energy of the vapor within the cell space above the free surface of the liquid are effective to transport the vapor along the latter flow path at near acoustic velocity.

The present method, then, effectively, utilizes a repetitive thermodynamic heat pump action which thermodynamically cycles the vapor emerging from the distillation cell along the condensation flow path in such manner as to continuously condense the emerging vapor and heat the incoming liquid to the saturation temperature corresponding to the saturation pressure existing in the cell space. The particular thermodynamic cycle which occurs in one disclosed form of the apparatus approximates a Rankine cycle involving generally isentropic and isobaric expansion phases. During the expansion phases of this cycle, evaporation occurs both at the free surface of the incoming liquid to be distilled and that the surface of the liquid condensate in the condensate flow path. As just noted, this vaporization of the condensate occurs with sufficient kinetic energy to cause reverse flow of the condensate vapor along the condensate flow path. However, the kinetic energy of this condensate vapor is dissipated, with resultant recondensation of the vapor and heating of the incoming liquid, by virtue of the vapor pressure gradient along the latter flow path. During the compression phases of the Rankin cycle, the vapor emerging from the cell along the condensation flow path is super heated and then condensed, as the vapor approaches the down stream end of this flow path, to heat, to the proper saturation temperature, the liquid entering the cell along the liquid inflow path. The thermodynamic cycle which occurs in a second disclosed form of the apparatus approximates a carnot cycle.

A typical distillation apparatus according to the invention incorporates at least one, and normally several hundred distillation cells arranged side by side in somewhat checkerboard fashion. The liquid to be distilled is supplied to the apparatus in a continuous flow which divides between the several distillation cells. The condensate emerging from the several cells is combined to produce a continuous condensate outflow. Accordingly, the present distillation apparatus is capable of effecting a continuous distilling action. A variety of means, herein referred to as acoustical transponders, may be employed to generate the required acoustic pressure waves or fluctuations within the distillation cells of the apparatus. In one disclosed embodiment, the acoustic transponder comprises a thin membrane which extends over the cells and is caused to vibrate at the proper acoustic frequency by electrical or electrostatic action. Preferably, the acoustic pressure fluctuations produced by the acoustic transponder occur at the resonant frequency of the distillation cells to minimize reactive forces on the transponder and, thereby, the required power input to the transponder. In a second disclosed embodiment, the acoustic transponder comprises a resonant acoustic engine which is devoid of any moving parts and involves simply vapor condensation occurring in communicating cell spaces alternately to produce pressure fluctuations which occur at a resonant acoustic frequency and act on the free surface of the incoming liquid.

As noted earlier, the present distillation method and apparatus may be employed for a variety of purposes. The principal application of the invention, however, involves the conversion of sea water to fresh water. The present method and apparatus exhibit many inherent advantages, particularly in the above-noted sea water conversion application. Among the foremost of these advantages is the ability of the method to be carried out, and the ability of the apparatus to operate, at or about ambient temperature, with the liquid condensate or fresh water emerging from the apparatus at approximately the same temperature as the entering sea water, whereby the heat loss from the apparatus is reduced to an absolute minimum. Energy losses in the present distillation apparatus are further reduced by generating the acoustic pressure fluctuations at the resonant frequency of the distillation cells to minimize the reactive forces on the acoustic transponder. Another important advantage of the present distillation method and apparatus resides in the fact that the pressure difference across the heat transfer walls of the apparatus which separate the evaporation and condensation sides of the apparatus are relatively small and occur at relatively high frequencies. As a consequence, these walls are required to support only their own weight and the existing static pressure heads involved. A relatively large total surface area for heat exchange, and a correspondingly large condensate output, per unit volume of the apparatus are thus possible. The low operating temperatures permitted by the present method and apparatus, particularly when desalting of sea water, also minimize fouling of the heat exchange surfaces and thereby aid in maintaining high heat transfer efficiency of these surfaces and overall high operating efficiency of the apparatus. Another advantage of the invention involves the fact that the acoustic pumping action embodied in the present method and apparatus is much more efficient than the pumping actions involved in other vapor re-heat cycles. This improved efficiency is due, in part, to the fact that the acoustic pump may be operated at the resonant frequency of the distillation cells and, in part, to the fact that the acoustic pumping losses are utilized to merely saturate the incoming liquid. A further advantage of the invention is that the low operating temperatures involved in the present distillation method and apparatus permit the use of promoters on the heat exchange surfaces of the apparatus to attain relatively high heat transfer rates and correspondingly high condensate output rates with an acoustic distillation apparatus of relatively small overall size. Other advantages of the invention will appear as the description proceeds.

A general object of the present invention, therefore, is to provide a novel acoustic distillation method and apparatus.

Another object of the invention is to provide a distillation method and apparatus of the character described wherein thermal and other losses are reduced to an absolute minimum and operating efficiency is correspondingly increased.

Yet another object of the invention is to provide a distillation method and apparatus of the character described which are ideally suited for converting sea water to fresh water.

A related object of the invention is to provide a sea water distillation method and apparatus capable of practice and operation at temperatures approximating normal atmospheric temperature, whereby heat losses are minimized.

A further object of the invention is to provide a distillation method and apparatus of the character described which utilize a novel acoustic pumping action which may operate at a resonant frequency in such manner as to minimize or virtually eliminate reactive forces which oppose the acoustic pumping action, whereby pumping efficiency is substantially increased and the power input required for pumping is materially reduced.

Yet a further object of the invention is to provide a distillation method and apparatus of the character described wherein the pressure differentials across the heat exchange surfaces are relatively small and occur at relatively high frequency, thereby to permit a relatively large total heat exchange surface area and a correspondingly large condensate output rate per unit volume and unit weight of the apparatus.

A related object of the invention is to provide a distillation method and apparatus of the character described which permit distillation at relatively low temperatures that inhibit fouling of the heat exchange surfaces and, thereby, aid in maintaining high operating efficiency.

Other objects, features and advantages of the present invention will become apparent to those versed in the art from a consideration of the following description, the appended claims and the accompanying drawings.

BRIEF DESCRIPTION OF THE DRAWINGS

FIGS. 6, 7 and 8 diagrammatically illustrate accoustical vapor engines, the principle of which is utilized in the modified acoustic distillation apparatus to generate acoustic pressure fluctuations.

DESCRIPTION OF THE PREFERRED EMBODIMENT

Figure 1:
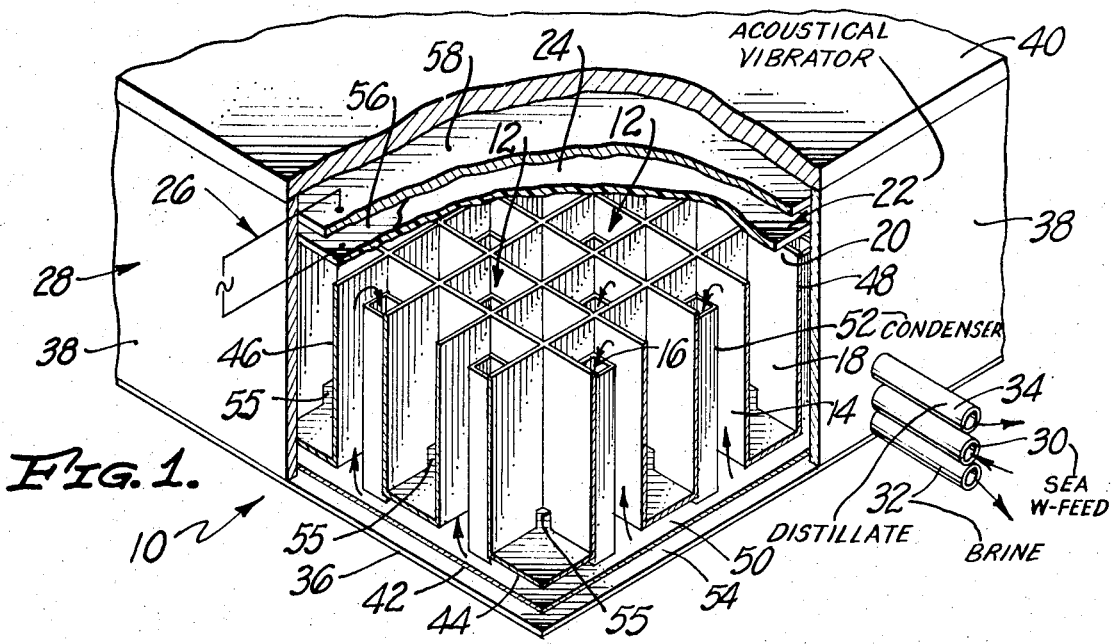
FIG. 1 is a fragmentary perspective view, partly broken away, of a multicell acoustic distillation apparatus according to the invention.
Figure 2:
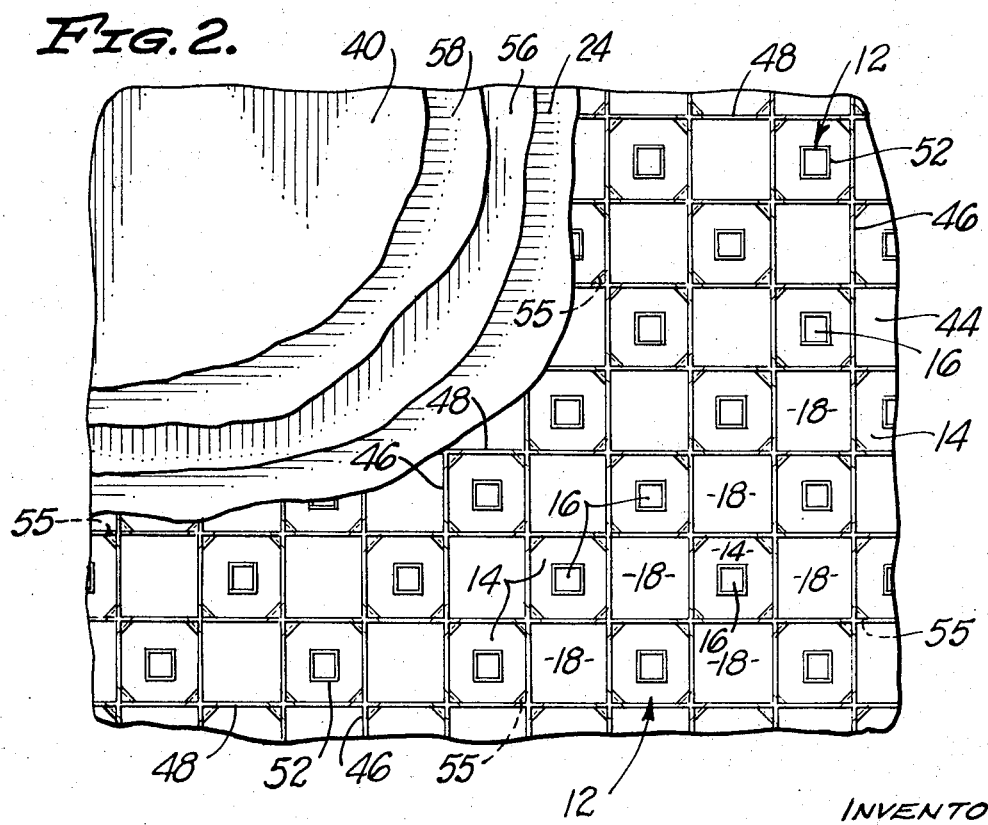
FIG. 2 is a fragmentary horizontal section through the apparatus.
Figure 3:
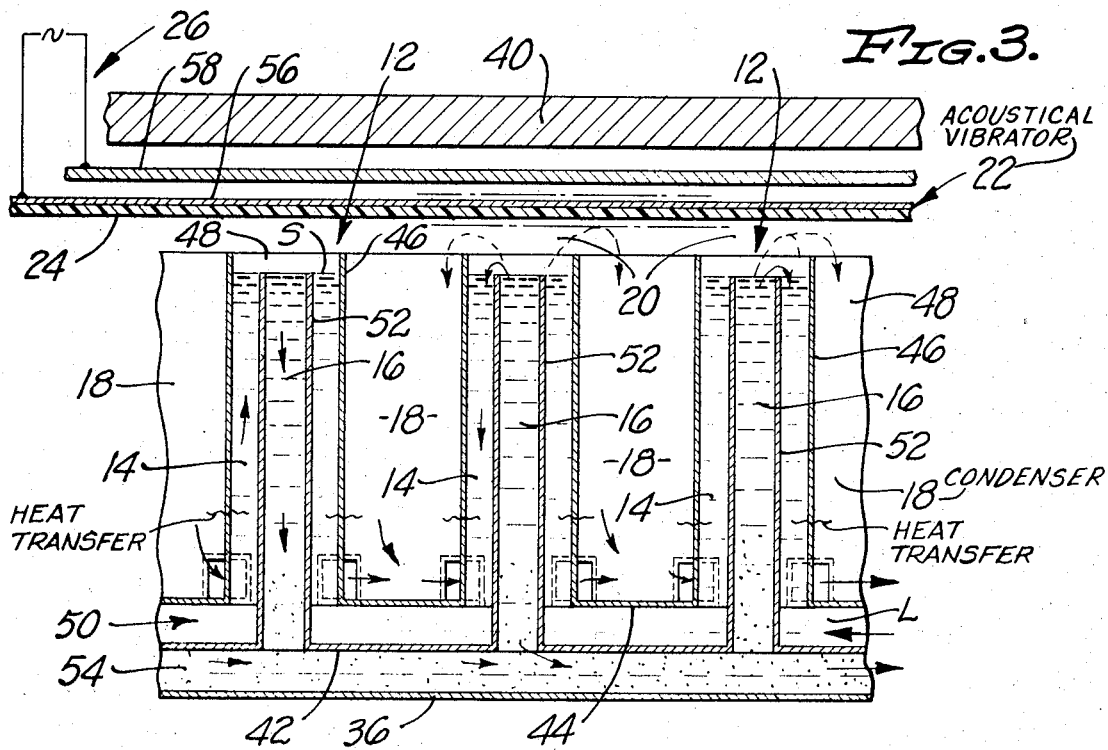
FIG. 3 is an enlarged fragmentary vertical section through the apparatus.

The distillation apparatus 10 of the invention which has been selected for illustration in FIGS. 1–3 of these drawings comprises a number of distillation cells 12 arranged side by side in generally checkerboard fashion. Each cell 12 includes a liquid inflow passage 14 through which the liquid to be distilled enters the cell, a liquid outflow passage 16 through which the liquid emerges from the cell, and a condensation passage 18 within which the vapor evolved from the incoming liquid during operation of the apparatus is condensed and the resulting liquid condensate emerges from the cell. The liquid entering the distillation cell 12 has a free surface S exposed to an evaporation space 20 above the surface. The condensation passages 18 of the distillation cells communicate with this evaporation space.

Located above the several distillation cells 12 is an acoustic transponder 22 for generating pressure waves or fluctuations at an acoustic frequency within the cells. As noted earlier, and hereinafter discussed, a variety of acoustic transponders may be employed in the present distillation apparatus. The particular transponder illustrated comprises a flexible diaphragm or membrane 24 which extends across the several distillation cells and defines the upper wall of the evaporation space 20. Associated with this membrane are means 26 for driving or vibrating the membrane through a small amplitude at a selected acoustic frequency. For reasons noted earlier, and hereinafter explained in more detail, the frequency of vibration of the membrane preferably approximates the natural or resonant frequency of the distillation cells.

The several distillation cells 12 are enclosed in an outer housing or casing 28. Leading from this casing are a liquid inflow line 30, a liquid outflow line 32, and a condensate outflow line 34. The liquid inflow and outflow lines 30 and 32 communicate, respectively, with the several liquid inflow and outflow passages 14, 16 in the apparatus. The condensate line 34 communicates with the several condensate flow passages 18 in the apparatus.

Briefly, during operation of the acoustic distillation apparatus 10, a liquid to be distilled is continuously fed to the apparatus through the liquid inflow line 30 and emerges from the apparatus through the liquid outflow line 32. The flow of incoming liquid divides between the several distillation cells in such a way that the liquid enters each cell through its inflow passage 14 and leaves the cell through its outflow passage 16. The liquid is thus transported through the several distillation cells in such a way that the liquid has a free surface S within each cell which is exposed to the evaporation space 20 above the cells. The acoustic transponder or membrane 24 is driven in vibration at an acoustic frequency, which is preferably the natural or resonant frequency of the distillation cells. This vibration of the membrane generates acoustic pressure waves or pressure fluctuations within the distillation cells which cause the internal pressure in the cells to proceed through alternate rarefaction and compression half cycles or modes. The rarefaction modes of this fluctuating pressure reduce the vapor pressure immediately adjacent the free liquid surfaces S in the distillation cells and thereby induce evaporation of liquid from these surfaces into the evaporation space 20 above the cells. This periodic, acoustically induced evaporation of liquid at the free surfaces S effectively transforms the enthalpy of the liquid into kinetic energy of the vapor. The compression modes of the fluctuating cell pressure super heats the evolved vapor remote from the free liquid surfaces. The condensation passages 18 direct or convey the vapor from the evaporation space 20 in heat transfer relation to the liquid entering the distillation cells 12 through the liquid inflow passages 14. The super heated vapor emerging through the condensation passages 18, therefore, is progressively cooled and condensed by heat transfer to the entering liquid. The entering liquid, in turn, is heated by this heat transfer to a saturation temperature which creates within the evaporation space 20, immediately adjacent the free liquid surfaces S, a saturation pressure exceeding the vapor pressure of the relatively cool condensate adjacent the down stream ends of the condensation passages 18. This difference between the saturation pressure in the evaporation space 20 and the vapor pressure in the down stream ends of the condensation passages 18 establishes a pressure differential along the latter passages which cooperates with the kinetic energy of the vapor within the evaporation chamber 20 and the pumping action of the vibrating membrane 24 to induce flow of vapor from the distillation cells through the condensation passages. As noted earlier, some of the condensate within the latter passages is revaporized during the rarefaction modes of the fluctuating cell pressure created by the vibrating diaphragm 24. This revaporization occurs with sufficient kinetic energy to cause reverse flow of a condensate vapor through the condensation passages. However, this reverse flow occurs against the pressure gradient in these passages which dissipates the kinetic energy of the vapor, thereby recondensing the vapor with resultant heat transfer to the liquid L entering the distillation cells.

Referring now in greater detail to the illustration distillation apparatus 10, the casing 28 of the apparatus has a generally rectangular shape and includes a bottom wall 36, upstanding side walls 38 along the edges of the bottom wall, and a top wall 40. Extending across the interior of the casing 28, in vertically spaced relation to one another and to the bottom casing wall 36, are a lower horizontal partition 42 and an upper horizontal partition 44. These partitions are located adjacent the bottom casing wall 36 and are joined about their edges to the casing side walls 38. Rising from the upper partition 44 are a number of vertical partitions 46 which are located in spaced vertical planes parallel to two opposite side walls 38 of the apparatus casing 28 and a number of vertical partitions 48 which are located in spaced vertical planes normal to the partitions 46. The partitions 46, 48 are uniformly spaced and are joined along their inter-sections to define therebetween a number of vertical rectangular cell like chambers which open at their upper ends to the evaporation space 20 and at their lower ends to the space 50 between the horizontal partitions 42, 44. Rising from the lower horizontal partition 42, along the axes of certain of these chambers, respectively, are a number of ducts 52. Each duct 52 has a rectangular horizontal cross-section which is substantially smaller than the horizontal cross-section of its containing chamber. The generally annular rectangular clearance spaces defined between the vertical partitions 46, 48 and the vertical ducts 52 define the liquid inflow passages 14. The central passages through the ducts 52 open to the space 54 between the lower horizontal partition 42 and the bottom casing wall 36 and define the liquid inflow passages 16.

As may be best observed in FIG. 2, the cell like chambers defined by the partitions 46, 48 and the ducts 52 are arranged in a first series of rows which parallel the partitions 46 and a second series of rows which parallel the partitions 48. The ducts 52 in each of these rows extend through alternate chambers in the respective row, whereby the adjacent chambers in each row containing ducts are separated by an intervening empty chamber, that is a chamber without a duct, and each chamber containing a duct is bounded at its four sides by empty chambers. These empty chambers define the condensation passages 18. As shown best in FIG. 4, the upper edges of the vertical partitions 46, 48 are disposed in a common plane located below and spaced from the acoustic transponder membrane 24. The upper ends of the ducts 52 are disposed in a common plane located below and spaced from the upper edges of the partitions 46, 48. During operation of the illustrated acoustic distillation apparatus 10, the liquid L to be distilled flows upwardly through the liquid inflow passages 14, then inwardly to the upper ends of the liquid outflow passages 16, and finally downwardly through the latter passages. The liquid is fed to the inflow passages 14 at a rate such as to maintain the illustrated liquid levels in these passages, thus to define the free liquid surfaces S just below the upper edges of the vertical partitions 46, 48. The space between these upper edges and the membrane 24 defines the evaporation space 20. It is evident at this point, therefore, that the free liquid surfaces S are exposed to the evaporation space 20 through the open upper ends of the liquid inflow passages 14 and that the condensation passages 18 open at their upper ends to and extend downwardly from the evaporation space. Each distillation cell 12 of the illustrated apparatus comprises one liquid outflow passage 16, its surrounding liquid inflow passage 14, and the four condensation passages 18 which bound four sides of the respective inflow passage. Adjacent distillation cells, therefore, share the intervening condensation passages.

The central passage through the liquid inflow line 30 opens to the space 50 between the two horizontal partitions 42, 44. This space, therefore, defines a liquid inflow space which communicates the inflow line to the inflow passages 14 in the several distillation cells 12. The central passage through the liquid outflow line 32 opens to the space 54 between a bottom wall 36 of the apparatus casing 28 and the lower horizontal partition 42. Space 54, therefore, defines a liquid outflow space which communicates the liquid outflow passages 16 in the several distillation cells to the liquid outflow line 32. The central passage through the condensate outflow line 34 opens to the lower end of the adjacent condensate passage 18. The several condensate passages, in turn, communicate with one another through diagonal passages 55.

As noted earlier, the acoustic pressure wave generator or transponder 22 of the illustrated acoustic distillation apparatus comprises a flexible membrane 24. This membrane extends over the several distillation cells 12, between the latter and the upper wall 40 of the apparatus casing 28. The membrane is attached about its edges to the side walls 38 of the casing. The membrane may be constructed of any suitable material, such as Mylar. The means 26 for driving the membrane in vibration may assume various forms. The illustrated membrane driving means, for example, comprises a conductive coating or film 56 on the upper surface of the membrane, a stationary electrical conductor or conductive plate 58 about and generally parallel to the membrane, and means 60 for impressing a periodic electrical potential between the conductive film 56 and the conductor plate 58 in such a way as to drive the membrane in vibration at a preselected acoustic frequency. This frequency is preferably selected to approximate the natural or resonant frequency of the distillation cells 12 in order to minimize the reactive forces on the membrane and, thereby, the power required to drive the membrane. In this case, the required driving force on the membrane is equal to the peak acoustical forces required in the distillation cells divided by the resonant quality factor "Q" of the system. This feature of the invention eliminates the requirement for large displacements of the membrane, thus permitting the membrane to vibrate through a small amplitude at an acoustic frequency. Other forms of acoustic transponders which may be employed in the present distillation apparatus will be discussed presently.

During operation of the illustrated acoustic distillation apparatus 10, the liquid L to be distilled is pumped or otherwise transported through the apparatus in such a way that the liquid enters and emerges from the apparatus through the liquid inflow and outflow lines 30 and 32, respectively, at the proper rate to maintain the free liquid surfaces S at their illustrated levels. The acoustic transponder 22 is operated to drive the membrane 24 at the proper acoustic frequency and thereby create cyclic acoustic pressure waves or fluctuations within the distillation cells 12. The pressure fluctuations cause the internal pressure in the distillation cells to proceed through alternate rarefaction and compression half cycles or modes. The periodic rarefaction modes of the fluctuating distillation cell pressure lower the vapor pressure at the free liquid surfaces S and thereby induce evaporation of liquid from these surfaces into the evaporation space 20. This acoustically induced evaporation of the liquid at the free surfaces S effectively transforms or converts the enthalpy of the liquid into molecular kinetic energy of the evolving vapor. As explained below, the vapor is induced to flow from the evaporation space 20 downwardly through the condensation passages 18. The periodic compression modes of the fluctuating distillation cell pressure created by the vibrating membrane 24 cause super heating of the vapor emerging through these condensation passages.

During its downward flow through the condensation passages 18, the super heated vapor is progressively cooled and condensed by heat transfer to the liquid entering the distillation cells 12 through the liquid inflow passages 14. This heat transfer occurs through the walls separating the condensation and liquid inflow passages, which walls are defined by the vertical partitions 46, 48. Dropwise condensation of the emerging vapor occurs on the surfaces of these partitions which bound and define the walls of the condensation passages. The liquid centering the distillation cells 12 is thereby continuously heated, in part by heat transfer from the super heated vapor within the upstream ends of the condensation passages and in part by the latent heat of condensation which is evolved in response to condensing of the vapor on the walls of the condensation passages, adjacent the down stream ends of these passages.

The present acoustic distillation apparatus is so constructed and arranged that the liquid L entering the distillation cells 12 through the liquid inflow passages 14 is heated, by heat transfer from the vapor and condensate within the condensation passages 18, to a temperature which produces, in the regions directly above and contiguous to the free liquid surfaces S, a saturation pressure exceeding the vapor pressure of the relatively cool condensate in the down stream ends of the condensate passages. The difference between the saturation pressure at the free liquid surfaces S and the vapor pressure in the down stream ends of the condensation passages 18 creates a pressure differential or pressure gradient along the latter passages. This pressure gradient, the kinetic energy acquired by the vapor in the evaporation space 20 as a consequence of the aforementioned conversion of liquid enthalpy to vapor kinetic energy during the acoustically induced evaporation in the distillation cells, and the mechanical pumping action produced by the vibrating or pulsating membrane 24, cooperate to induce flow of vapor from the evaporation space through the condensation passages.

It is now evident that the present acoustic distillation apparatus in part utilizes the kinetic energy obtained by the difference between the vapor pressure of the liquid at the free liquid surfaces S and the vapor pressure of the condensate in the down stream ends of the condensate passages 18 to transport vapor from the evaporation space 20 through the latter passages. Such a vapor is acquired, with an initial kinetic energy, at the liquid surfaces S by periodically acoustically lowering the vapor pressure at these surfaces and exchanging enthalpy for molecular kinetic energy. This kinetic energy along with the pressure drop provided by the higher vapor pressure of the liquid at the free liquid surfaces S transports the vapor through the condensate passages at near acoustic velocities. It is further evident that the operation of the present distillation apparatus involves a heat pump cycle which is effective to maintain the liquid entering the distillation cells 12 at the proper elevated temperature relative to the temperature of the condensate within the down stream ends of the condensate passages 18 to achieve the above-described pressure-and-kinetic-energy-induced transportation of vapor through the condensation passages. Thus, as the vapor travels downwardly through the condensation passages, the acoustically induced rarefaction and compression modes of the fluctuating pressure within the distillation cells thermodynamically cycles the vapor in such a way that the heat energy acquired by the vapor at the free liquid surfaces S is transferred to the incoming liquid with the resultant cooling of the emerging vapor and condensate in the condensation passages. According to the preferred practice of the invention, the liquid inflow and condensation passages are proportioned so that the emerging condensate is cooled to a temperature approximating the inlet temperature of the entering liquid.

Figure 4:
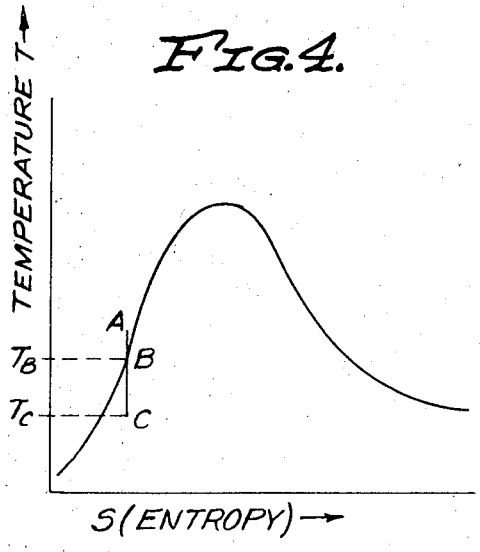
FIGS. 4 and 5 depict the thermodynamic cycle involved in the operation of the apparatus.
Figure 5:
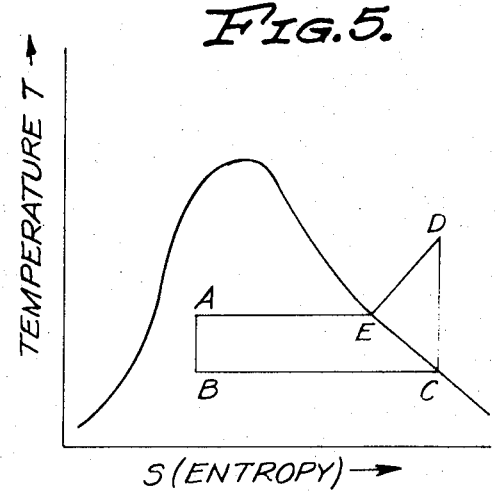
Figure 9:
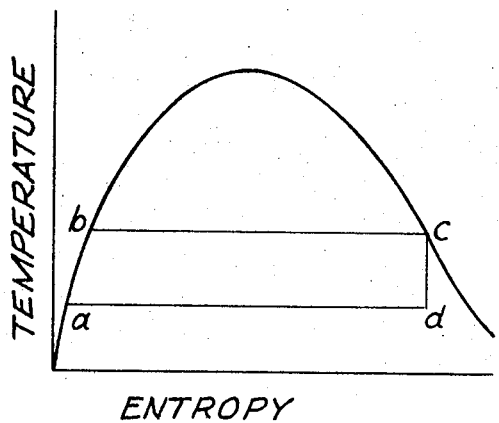
FIGS. 9 and 10 depict the thermodynamic cycle involved in the operation of the modified acoustic distillation apparatus.

As indicated by the temperature-entropy diagrams of FIGS. 4 and 5, the thermodynamic vapor cycle which occurs within the distillation cells 12 of the present acoustic distillation apparatus approximates a Rankine cycle. Thus, referring to FIG. 5, it will be observed that the vapor cycle involves a generally isentropic expansion phase from point A to point B, a generally isobaric expansion phase from point B to point C, and initially generally isentropic compression phase from point C through point D to point E, and a generally isobaric compression phase from point E to point A. During the isentropic and isobaric compression phases A–B and B–C of the vapor cycle, which occur during the rarefaction modes of the acoustically induced pressure fluctuations in the distillation cells 12, evaporation occurs at the free liquid surfaces S from point B to point C in FIG. 4. The enthalpy difference between points B and C in FIG. 4 has now been converted into kinetic energy of the saturated vapor entering the condensation passages 18 from the evaporation space 20. This saturated vapor traveling with its initial kinetic energy downwardly through the condensation passages 18, and across the vapor pressure drop in these passages, is represented, at the end of the rarefraction mode, by point C in FIG. 5. During the compression phases C–D, D–E, and E–A of the vapor cycle, which occur during the compression modes of the acoustically induced pressure fluctuations in the distillation cells, the saturated vapor within the condensation passages 18 is super heated from point C to point D in FIG. 5. As noted earlier, this super heated vapor exchanges heat with the liquid entering the distillation cells through the liquid inflow passages 14 and thereby assists in heating the entering liquid to its saturation temperature. During the final portions of the compression modes, condensation occurs on the walls of the condensation passages 18 and along the isothermal and isobaric line E–A in FIG. 5.

At this point, attention is directed to the fact that during the rarefraction modes of the acoustically induced pressure fluctuations in the distillation cells 12, commencing at point A in FIG. 5, some of the liquid condensate in the condensation passages 18 is revaporized, thereby cooling the remaining condensate to point B in FIG. 5. During the rarefraction mode from point B to point C in FIG. 5, additional condensate evaporates with sufficient kinetic energy to cause the condensate vapor to travel upwardly through the condensate passages 18. However, such upward flow of the vapor condensate occurs against the pressure gradient existing in the condensation passages. Consequently, the kinetic energy of the upwardly flowing condensate vapor is quickly dissipated by the pressure gradient, thereby increasing the temperature of the condensation in the condensation passages and resulting in ultimate heat exchange with the liquid entering the distillation cells through the inflow passages 14.

As noted earlier, the principal application of the present acoustic distillation method and apparatus involves the conversion of sea water to fresh water. In a typical sea water conversion application of the invention, the sea water will enter the acoustic distillation apparatus at a temperature on the order of 60 degrees and will be heated, by heat transfer from the vapor and condensate emerging through the condensation passages 18, to a temperature on the order of 72 degrees at the free liquid surfaces S. The vapor pressure at these surfaces, therefore, will be the saturation pressure of sea water at 72 degrees. The distillate temperature is reduced to the sea water in temperature during the isentropic expansion A–B in FIG. 5. The brine exit temperature is reduced to the sea water inlet temperature by the isentropic process B–C in FIG. 4.

Preliminary estimates indicate that a typical distillation apparatus according to the invention, for converting sea water to fresh water at a rate on the order of one million gallons a day, may contain approximately four hundred square feet of distillation cell area. This sea water conversion apparatus may comprise a 20 foot by 20 foot Mylar membrane which stretches over the entire distillation cell area. These initial estimates further indicate that the requisite displacement of the Mylar membrane to achieve the above-noted fresh water output is on the order of .010 inch. Such Mylar displacement may be obtained by the application of approximately 500 volts of electrical potential between the conductive film 16 on the membrane and the stationary conductor plate 58. The required energy input to this acoustical transponder will equal the heat loss from the apparatus plus any difference in energy between the sea water temperature input and the fresh water temperature output. Since the sea water conversion apparatus may be operated at or near ambient temperature, as noted earlier, losses may be minimized. The low operating temperatures of the apparatus also inhibit fouling of the heat transfer surfaces of the apparatus.

Another advantage of the invention resides in the fact that since the pressure differences between the evaporation and condensation sides of the distillation cells 12 are small and occur at a relatively high frequency, the heat exchange walls of the cells are required to support only their own weight. Consequently, a large surface area for heat exchange per unit volume and unit weight is possible. As noted earlier, operation of the acoustic transponder 22 at the resonant frequency of the distillation cells is preferred for the reason that losses occasioned by reactive forces are minimized. This frequency is a function of the heat transfer area. The heat transfer area, in turn, is directly proportional to the length of the distillation cell. Resonance requires that the cell length be some multiple of a half of an acoustical wavelength. Therefore a frequency is selected which along with the selected pressure range will give a distillation cell with an area just large enough to transfer the required heat. Stated in another way, the production rate is a dependent variable. The pressure range, cell length and cell width or cell area are the independent variables. The frequency of operation depends on cell length. The vapor heat pump action which is accomplished acoustically according to the present invention is substantially more efficient than the vapor heat pump action accomplished in other vapor reheat cycles. This is due, in part, to the resonant operation of the present acoustical transponder and, in part, to the fact that the acoustic heat pump action in the present invention is utilized to merely saturate the incoming liquid or sea water.

The low operating temperatures involved in the present acoustic distillation method and apparatus, particularly when employed for sea water conversion, permit the use of promoters along the condensation surfaces or walls of the condensation passages 18. These promoters, in turn, achieve relatively high heat transfer rates, on the order of 2000 B.t.u. per square foot per hour per degree F to the incoming liquid or sea water entering the distillation cells. These high heat transfer rates, in turn, permit the use of relatively short condensation passages which, in a typical sea water conversion application, may be on the order of two inches long.

It is now obvious to those skilled in the art that the present acoustical desalination process is a thermal-mechanical resonance process wherein the transponder membrane stores energy mechanically which it acquires thermodynamically to be converted to thermodynamic energy at a different time in the distillation cycle. This stored energy, acquired in cooling the product to its entrance temperature, is available to be used in superheating the evaporated distillate so that heat may be transferred to the incoming sea water. As noted earlier, the present acoustic distillation apparatus may utilize other acoustic transponders than that illustrated. For example, the acoustic transponder may comprise a reciprocating mechanism, structure, a rotating aerodynamic surface, or means for producing nonlinear electric fields to provide dielectrophoretic forces.

The acoustic distillation apparatus 100 illustrated in FIG. 6 of the drawings has a distillation cell structure 102 which is identical to that embodied in the earlier described distillation apparatus. Accordingly, it is unnecessary to describe the cell structure 102 in detail. Moreover, the various parts of the cell structure 102 are designated by the same reference numerals as their counterparts in the earlier apparatus. From this discussion, it will be understood that the cell structure 102 has a number of distillation cells 12 arranged side by side in generally checkerboard fashion. Each cell 12 includes a liquid inflow passage 14 through which the liquid to be distilled enters the cell, a liquid outflow passage 16 through which the liquid emerges from the cell, and a condensation passage 18 within which the vapor evolved from the incoming liquid during operation of the apparatus is condensed and the resulting liquid condensate emerges from the cell. The liquid entering the distillation cell 12 has a free surface S exposed through an evaporation space 20 above the surface. The condensation passages of the distillation cells open upwardly to this evaporation space and communicate with one another through diagonal passages 55. Cell structure 102 has the same sea water infeed conduit, brine outfeed conduit, and distillate outfeed conduit as the earlier distillation apparatus. These conduits are not shown in FIG. 6.

Figure 7:
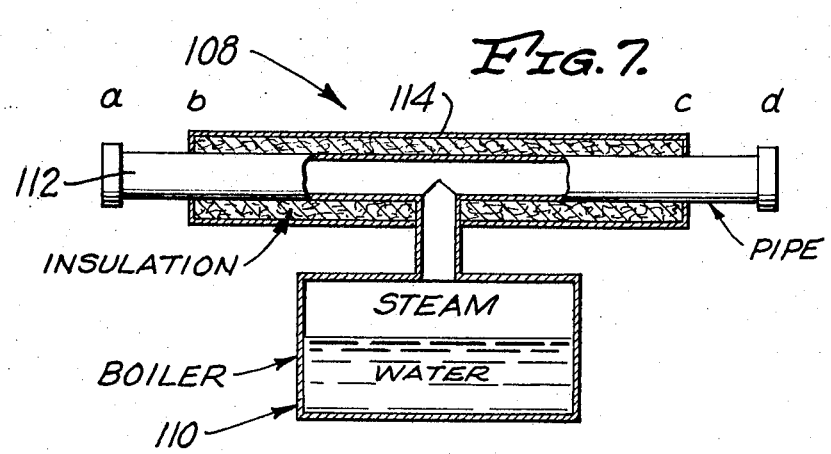

The acoustic distillation aparatus 100 utilizes acoustic means 104 comprising a plurality of novel acoustical vapor engines 106. The operating theory of the acoustical vapor engine will be explained with reference to FIGS. 7 through 10. Referring first to FIG. 7, there is diagrammatically illustrated a simple acoustical vapor engine 108 consisting of a boiler 110, a horizontal condenser pipe 112 communicating at its center to the boiler 110, and insulation 114 encasing the central portion of the pipes so as to leave exposed its end portions $a$–$b$ and $c$–$d$. Steam generated in the boiler 110 will condense at either end of the horizontal condenser pipe 112 which is exposed to the environment and capable of transferring heat to the environment. As the steam condenses, more steam will travel to these heat transfer ends of the pipe by virtue of the pressure drop created by the condensation. Condensing steam is capable of doing work, but in the simple system shown the condensing steam serves only to heat the environment. Since there are no mechanical parts, there is nothing to do work against except the vapor between points $b$ and $c$. That is, if the vapor between $c$ and $d$ were doing work, it would increase the pressure between points $a$ and $c$ and further the temperature increase between points $a$ and $b$, thereby increasing the heat transfer to the environment. Such a system is called a heat pump. It is capable of transferring heat at a rate of several times the input work. This ratio is called the Coefficient of Performance.

Once started, an acoustical vapor engine like that of FIG. 7 will continue to operate at its resonant frequency. Thus, the work done at $c$–$d$ will increase the pressure at $a$–$b$. This stored potential energy will then serve to increase the pressure at $c$–$d$ and the pressure at $a$–$b$ will decrease. When the pressure at $a$–$b$ falls below the Wilson line, i.e., the line to which vapor must be supercooled for spontaneous condensation, condensation will take place. Work is then done on the steam between $b$ and $d$ and the cycle repeats. This cycle occurs at the resonant frequency of the system and produces acoustic pressure fluctuations at the free water surface in the boiler.

Figure 10:
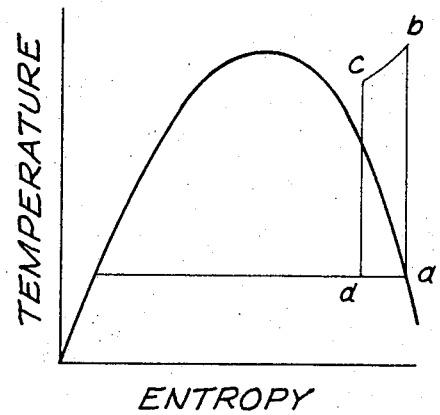

Such an acoustical engine has no useful purpose except to generate acoustic energy. As a heat pump, it has a very interesting feature. The heat transferred at one end of the system is greater than the work done at the other end. FIG. 8 illustrates such a heat pump application. In this case, acoustical vapor engine 108a is the same as the engine 108 of FIG. 7 except that the ends of the horizontal condenser pipe have been folded downward and into contact with the water in the boiler 110a. The operation of such a system can best be described with the aid of the Temperature-Entropy chart shown in FIG. 9. This describes a steam engine working in almost a Carnot cycle. Such an engine requires a heat input of $a$ to $c$ to do an amount of work of $c$ to $d$. If the total efficiency of this engine were 20% then the work accomplished between $c$ and $d$ would be 20% of the required heat input between $a$ and $c$. If the acoustical engine of FIG. 8 were operating in the cycle of FIG. 9 and the heat transfer system were operating with a coefficient of performance of 5, then the work done would transfer all of the heat back to the boiler required to keep the system operating. However, such a system would obviously be a perpetual motion device of the "second kind" and would violate the second law of thermodynamics. The important point so far as the present invention is concerned is that more heat can be transferred than the work required to keep the machine operating. Obviously some energy will be required to compensate for losses if we want the engine to continue to operate. This energy could be supplied by installing an electric resistance heater at some point. The temperature-entropy diagram of FIG. 9 describes the substance entering this system during each cycle. A description of the process occurring with the substance already in the system is depicted in FIG. 10. The work done between $c$ and $d$ of FIG. 9 compresses the fluid at the other end of the system. This compression process is ideally shown as $a$–$b$ in FIG. 10. Heat is transferred along $b$–$c$. This heat transfer will be equal to the heat required along $a$ to $c$ of FIG. 8 if the ratio of the entering mass to the mass existing in the system is correct. For a balanced system, the amount of liquid leaving the system must equal the amount entering. Therefore the amount of liquid at point $c$ of FIG. 10 must equal the mass of vapor represented by $a$ to $c$ of FIG. 9. This is a matter of adjusting the mass ratio of entering substance to the total system volume.

The acoustical engine described above runs without mechanical moving parts, tranfers heat at large temperature differences, and evaporates and condenses (distills) the working substance. The operating cost of desalination is thus a function of how efficient or how low the losses can be maintained. The losses can be kept at a minimum by making the system as compact as possible. This is accomplished in the distillation apparatus shown in FIG. 6, which, as noted earlier, uses the acoustical engine principal described above to create within the vapor space 20 the acoustic pressure fluctuations necessary to the present acoustic distillation method. The blank cells 18 are the condensation cells or the folded arms of the acoustical engine. The cells containing the inflow and outflow passages 14, 16 are the boilers. Notice that each condensation cell 18 is completely surrounded by boilers and each boiler is completely surrounded by condensation cells for maximum heat transfer area. The blank cells 18 bounding each boiler operate as one acoustical engine, but not independently, since starting two cells will excite adjacent cells until the whole system is running. The several acoustical vapor engines which make up the transponder means 104 thus operate in unison to produce in the vapor space 20 the acoustic pressure fluctuations which cause the present distillation process to proceed in the manner explained in connection with FIGS. 1–3. Salt water enters the system on the outside of the square pipes 52 of the boiler cells. Some of it evaporates due to the heat it absorbed on the way up. The concentrated brine leaves the system down the square boiler pipes 52. The condensor cells or acoustical engine cells are all connected together though the passages 55 allowing the distillate to be removed. Mounted on top of the cell structure 102 is a motor driven piston 115 movabe in a cylinder 116 which opens to the condensation space 20 through ports 118. Piston 115 is driven at the start of a distillation run at the proper speed to start the acoustical vapor engines 106.

Those versed in the art will appreciate that the present invention achieves the objects and realizes the advantages hereinbefore mentioned.

The inventor claims:

1. Acoustic distillation apparatus comprising:
   a casing having an upper internal evaporation space, and a number of vertically disposed distillation cells arranged side by side in checkerboard fashion below said space,
   a first liquid flow space beneath said cells through which liquid to be distilled is arranged to flow, a second liquid flow space beneath said first liquid flow space through which liquid discharged from said cells flows,
   each distillation cell including vertical liquid inflow and outflow passages which are connected respectively to said first liquid flow space and to said second liquid flow space and having upper communicating ends opening to said evaporation space for conveying a liquid to be distilled through said casing and each of said cells in such manner that said liquid has a free surface exposed to said space at the upper ends of said passages, and a vertical condensate passage chamber adjacent each of said cells and having an upper end opening to said evaporation space for collecting and conveying condensate from said space in heat transfer relation to the liquid entering through said liquid inflow passage, and
   an acoustic transponder within said casing comprising a vibrating membrane extending over the distillation cells in said evaporation space for generating cyclic pressure fluctuations at an acoustic frequency within said casing to cause the internal casing pressure within said evaporation space and the several condensate passages to proceed through alternate rarefaction and compression modes in such a way as to periodically lower the vapor pressure at the free liquid surfaces within said distillation cells during said rarefaction modes, thus to induce vaporization of liquid from said surfaces into said evaporation space, and to periodically super heat the evolved vapor within said condensate passages during said compression modes, thereby to establish a condition of thermalequilibrium wherein the super heated vapor emerging through said condensate passages is progressively cooled and condensed by heat transfer to the liquid entering through the several liquid inflow passages, the entering liquid is continuously heated by said heat transfer to a temperature which establishes within said evaporation space at said free liquid surfaces a saturation pressure exceeding the vapor pressure of the relatively cool condensate adjacent the downstream ends of said condensate passages, a pressure gradient exists along said condensate passages, and said pressure gradient and the kinetic energy of the vapor within said evaporation space coact to induce flow of vapor from said space through said condensate passages.

2. Acoustic distillation apparatus according to claim 1 wherein:
   said acoustic transponder includes means for generating said acoustic pressure fluctuations at a frequency approximating the resonant frequency of said distillation cells.

3. Acoustic distillation apparatus according to claim 1 wherein:
   said acoustic transponder comprises a generally horizontal flexible membrane extending over said evaporation space, and means for driving said membrane in vibration.

4. Acoustic distillation apparatus according to claim 1 wherein:
   the lower ends of said liquid inflow passages communicate with a common liquid inflow line, the lower ends of said liquid outflow passages communicate with a common liquid outflow line, and the lower ends of said condensate passages communicate with a common condensate line.

5. Acoustic distillation apparatus according to claim 1 wherein:
   said liquid outflow passage of each distillation cell extends centrally through and has its open upper end located a distance below the open upper end of the liquid inflow passage of the respective cell, whereby said free liquid surface of the respective cell is formed in the upper end of the corresponding liquid inflow passage, and
   said condensate passages are spaced about said liquid inflow passages in such a way that said distillation cells have common condensate passages.

6. Acoustic distillation apparatus according to claim 5 wherein:
   said passages are defined by set of vertically mutually perpendicular partitions within said casing.

7. Acoustic distillation apparatus comprising:
   a casing having an upper internal evaporation space, and a number of vertically disposed distillation cells arranged side by side in checkerboard fashion below said space,
   a first liquid flow space beneath said cells through which liquid to be distilled is arranged to flow, a second liquid flow space beneath said first liquid flow space through which liquid discharged from said cells flows,
   each distillation cell including vertical liquid inflow and outflow passages which are connected respectively to said first liquid flow space and to said second liquid flow space and having upper communicating ends opening to said evaporation space for conveying a liquid to be distilled through said casing and each of said cells in such manner that said liquid has a free surface exposed to said space at the upper ends of said passages, and a vertical condensate passage chamber adjacent each of said cells and having an upper end opening to said evaporation space for collecting and conveying condensate from said space in heat transfer relation to the liquid entering through said liquid inflow passage, said condensate passages forming condensor cells of an acoustical vapor engine; and
   means for inducing a pulsating condensing action back and forth between said condenser cells for generating cyclic pressure fluctuations at an acoustic frequency within said casing to cause the internal casing pressure within said evaporation space and the several condensate passages to proceed through alternate rarefaction and compression modes in such a way as to periodically lower the vapor pressure at the free liquid surfaces within said distillation cells during said rarefaction modes, thus to induce vaporization of liquid from said surfaces into said evaporation space, and to periodically super heat the evolved vapor within said condensate passages during said compression modes, thereby to establish a condition of thermalequilibrium wherein the super heated vapor emerging through said condensate passages is progressively cooled and condensed by heat transfer to the liquid entering through the several liquid inflow passages, the entering liquid is continuously heated by said heat transfer to a temperature which establishes within said evaporation space at said free liquid surfaces a saturation pressure exceeding the vapor pressure of the relatively cool condensate adjacent the down stream ends of said condensate passages, a pressure gradient exists along said condensate passages, and said pressure gradient and the kinetic energy of the vapor within said evaporation space coact to induce flow of vapor from said space through said condensate passages.

References Cited

UNITED STATES PATENTS

| | | |
|---|---|---|
| 2,265,762 | 12/1941 | McKittrick et al. __ 203—100 X |
| 2,514,797 | 7/1950 | Robinson. |
| 3,050,447 | 8/1962 | Olney _____ 203—91 |
| 3,127,330 | 3/1964 | Katz. |
| 3,212,999 | 10/1965 | Sommers _____ 203—100 |
| 3,275,532 | 9/1966 | Harper. |
| 3,305,454 | 2/1967 | Cowley. |
| 3,305,455 | 2/1967 | Loebel. |
| 3,317,405 | 5/1967 | Brown. |
| 3,337,420 | 8/1967 | Zeff et al. |
| 3,367,848 | 2/1968 | Curtis et al. |
| 3,410,765 | 11/1968 | Bodine _____ 203—100 |

OTHER REFERENCES

U.S. Dept. of Interior Report #49, Use of Acoustic Vibrations, March 1961, pp. 83, 140 and 141.

NORMAN YUDKOFF, Primary Examiner

D. EDWARDS, Assistant Examiner

U.S. Cl. X.R.

203—11, 24, 26, 100; 202—234